United States Patent [19]

Dunahoo

[11] 4,105,817

[45] * Aug. 8, 1978

[54] MULTI-CHAMBERED CELLULAR STRUCTURE

[75] Inventor: Edmond O. Dunahoo, Long Beach, Calif.

[73] Assignee: Fiber Science, Inc., Gardena, Calif.

[*] Notice: The portion of the term of this patent subsequent to Jun. 8, 1993, has been disclaimed.

[21] Appl. No.: 693,558

[22] Filed: Jun. 7, 1976

Related U.S. Application Data

[62] Division of Ser. No. 465,323, Apr. 29, 1974, Pat. No. 3,962,506.

[51] Int. Cl.² .............................................. B32B 3/26
[52] U.S. Cl. ................................... 428/188; 428/158; 428/166
[58] Field of Search ............... 428/158, 166, 188, 159, 428/160, 105–112; 416/226; 244/123

[56] References Cited

U.S. PATENT DOCUMENTS

| 2,362,301 | 11/1944 | Pecker | 416/226 |
| 3,028,292 | 4/1962 | Hinds | 244/123 |
| 3,237,697 | 3/1966 | Ford et al. | 416/226 |
| 3,713,753 | 1/1973 | Brunsch | 416/226 |
| 3,754,840 | 8/1973 | Zincone | 416/226 |
| 3,962,506 | 6/1976 | Dunahoo | 428/158 |

Primary Examiner—William J. Van Balen
Attorney, Agent, or Firm—Blakely, Sokoloff, Taylor & Zafman

[57] ABSTRACT

A fiber-reinforced plastic article of manufacture having a multi-chambered, cellular structure with an outer shell and an inner shell for use as part of a fluid foil structure, said inner shell extending between at least two generally opposite interior walls of said outer shell and being coupled thereto, thereby defining at least two chambers within said article, the wall of each of said shells being composed of a plastic having embedded therein at least one layer of continuous roving of a fibrous reinforcement material, said at least one layer in each of said shells being continuous and unbroken around each of said shells.

18 Claims, 18 Drawing Figures

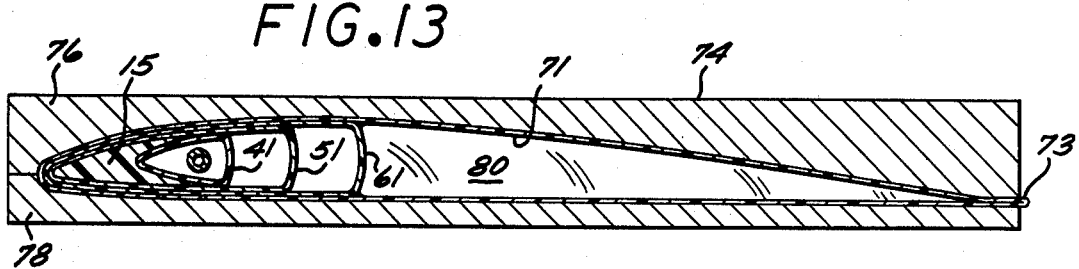
FIG. 13
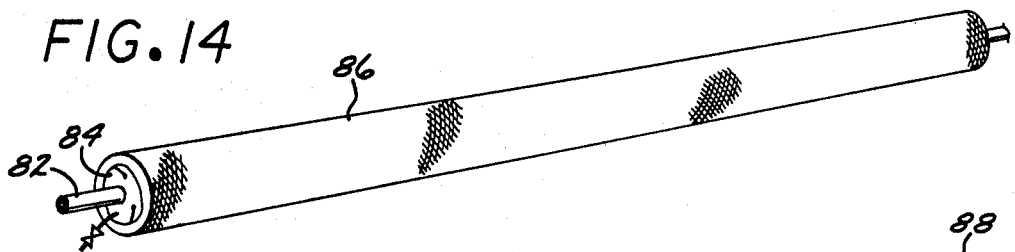
FIG. 14
FIG. 15
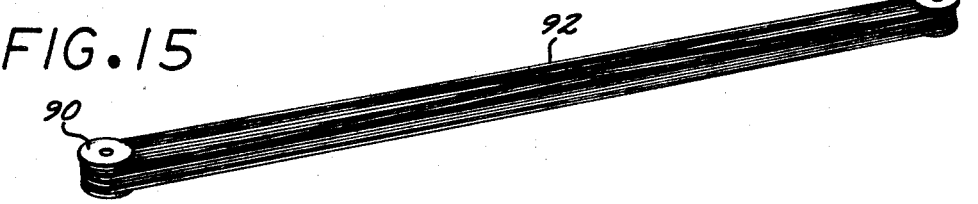
FIG. 16
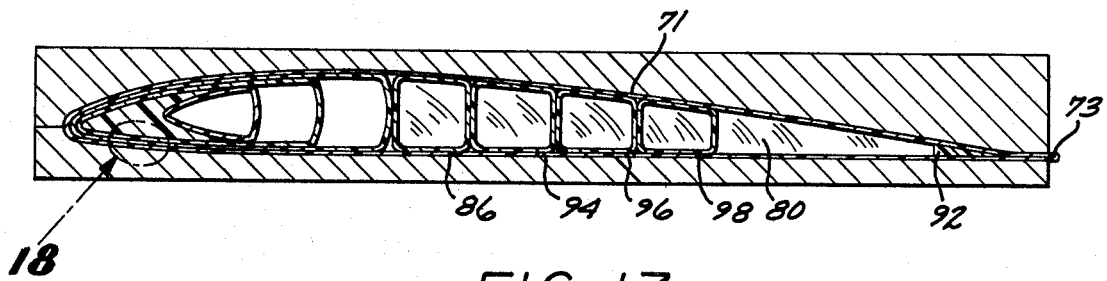
FIG. 17
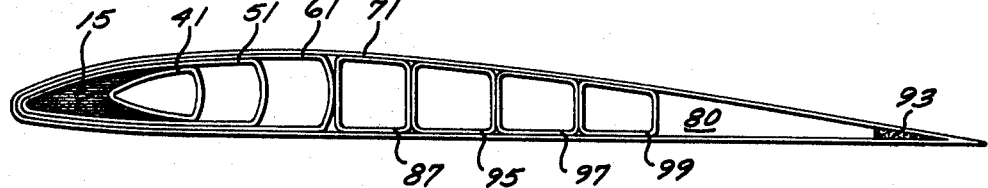
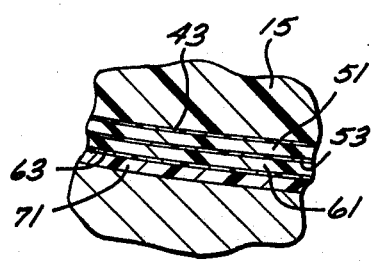
FIG. 18

MULTI-CHAMBERED CELLULAR STRUCTURE

This is a division of application Ser. No. 465,323, filed Apr. 29, 1974, now U.S. Pat. No. 3,962,506.

BACKGROUND OF THE INVENTION

1. Field of the Invention

This invention relates to a fiber-reinforced, plastics article of manufacture which has a noncircular cross section and which is of a multi-chambered, cellular construction and to a method for manufacturing such article.

2. Description of the Prior Art

Fiber reinforced plastics are well known and used for many purposes. Typically, the reinforcing fiber used is a woven fabric that is applied over a mold and coated with a bonding resin. Some special application tools have been developed in which the fibers are applied as chopped strands embedded in a resin and this method obviates much of the labor required when woven fabrics are used. In both of these applications, however, the ultimate strength of the reinforcing fiber is not achieved in the final product.

There is a continuous-filament winding process that has been employed for the manufacture of articles of circular cross section to obtain very strong and lightweight products. This process has been typically employed for the fabrication of pressure vessels and generally comprises winding continuous filaments of a fibrous reinforcing material about a mandrel in circumferential or helical windings to form a plurality of layers of filaments with the windings of the filaments in adjacent layers being diagonally oriented. The filaments are embedded with a bonding resin which is then cured to cement the product into a rigid, strong vessel of a circular cross section.

Recent modifications of this process employing a flexible and inflated mandrel have achieved the fabrication of very strong, lightweight, hollow products having noncircular cross sections. It is desirable in such manufacture to incorporate ballast and strength-imparting members in such a fashion that these members become an integral portion of the final article of manufacture. It is also desirable to provide some means for the attachment of the article of manufacture to other supporting structure.

SUMMARY OF THE INVENTION

I have now provided a method whereby longitudinal spar and reinforcing members can be incorporated in the continuous filament winding process used for the fabrication of cellular articles of manufacture having noncircular cross sections. In a specific application of my method, lightweight and very strong helicopter blades can be manufactured.

In the fabrication of an airfoil section by this method, a solid-form, longitudinal, leading edge member is prepared by the wrapping of a continuous filament about two opposite spools or bobbins to prepare a skein of the filament thereon; the filament is impregnated with a suitable bonding resin and is placed in a mold cavity and die-formed therein into a solid-form member of the desired cross section, e.g., of an airfoil cross section with a concave groove along its trailing edge. The bonding resin is cured to cement the filaments of the skein into a solid bundle of unidirectional filaments. In this forming, one of the ends of the skein, including the spool or bobbin on which the filament is wrapped, can also be molded into the final shape to provide a load-bearing support for the longitudinal member and for the airfoil section formed about this member in the succeeding steps of the method.

A first hollow tubular member is then formed and molded into the concave groove of the trailing edge of the solid-form members. This tubular member is formed by a continuous-filament winding process on a flexible-sheet cylindrical mandrel. The winding process yields a multilayered flexible sheathing which is expanded by an internal, positive differential pressure into contour-conforming contact with the concave groove of the trailing edge of the spar member and cemented into a rigid tubular member which is bonded to the spar member by curing of the bonding resin of the sheathing.

The solid-form, longitudinal spar with its supporting spool member and trailing tubular member thus formed is then encased in a flexible mandrel by placing two end plates at either end thereof and by wrapping a flexible sheet material about the end plates to prepare a winding mandrel. The flexible sheet material is sealed in the assembly so that it can be inflated with a positive differential pressure to permit its use as the winding mandrel in a continuous-filament winding process. Suitable valve means can be provided, preferably in one of the end plates, to permit a controllable adjustability of the internal pressure within the mandrel. Filaments of fibrous reinforcing material are applied to the mandrel using techniques of the continuous-filament winding process in which the mandrel is rotated and wound while the filaments are guided in an end-to-end mandrel traversing motion across the mandrel to apply the filaments thereupon in circular or helical windings. The windings in each thickness of winding are diagonally oriented to the windings in adjacent thicknesses and each layer of windings comprises a down and back pass of thickness of such windings. After a plurality of such layers have been applied to the surface of the mandrel and embedded with resin, the internal pressure of the mandrel is released to collapse the windings thereon into a flexible sheathing. This flexible sheathing is draped about the internal longitudinal solid-form member and trailing edge tubular member and the assembly is placed in a suitable mold cavity of an airfoil cross section with the solid-form, longitudinal member being positioned at the leading edge thereof. The mold cavity is closed and a positive differential pressure is established inside the flexible sheathing to expand the sheathing outwardly into a contour-conforming contact with the internal die-faces of the mold cavity, whereupon the bonding resin is cured to cement the sheathing into a rigid, multi-chambered cellular shape having a solid-form, leading edge longitudinal spar member.

The process is repeated by forming another outer mandrel about the rigid, multi-chambered cellular shape. This process is repeated for a plurality of times, e.g., for up to about 2 to 10 times, to form a multi-chambered, cellular article of manufacture. The outermost sheathing is, of course, molded into the shape desired in the final article of manufacture, e.g., a suitable airfoil section useful as a helicopter blade or aerodynamic surface.

A solid-form, longitudinal member can be incorporated in the trailing edge of such an airfoil section. Preferably this solid-form, longitudinal member comprises a bundle of unidirectional filaments which are formed from a flexible skein of filaments that are wrapped about opposite support members such as spools or bobbins in a manner similar to that used for the fabrication of the leading edge, solid-form, longitudinal member.

If desired, any or all of the longitudinal compartments within the multi-chambered article of manufacture can be further reinforced by placement of flexible sheathings of continuously wound filaments therein and such sheathings can be expanded outwardly into contact with the interior walls of such compartments and, in such expanded position, cured into a rigid construction by curing of their bonding resins.

The various objects and advantages of the present invention will become apparent when considered in conjunction with the following brief description of the drawings.

BRIEF DESCRIPTION OF THE DRAWINGS

FIGS. 12 and 13 illustrate the fabrication of the outer member of the multi-chambered article of manufacture;

FIG. 14 illustrates the fabrication of additional flexible sheathings for longitudinal reinforcement of the article of manufacture;

FIG. 15 illustrates the fabrication of the solid-form, trailing-edge, reinforcement member of the article of manufacture;

FIGS. 16 and 18 illustrate the final molding step of the article of manufacture; and FIG. 17 is a cross sectional view of the finished article of manufacture.

DESCRIPTION OF THE PREFERRED EMBODIMENT

Figure 1:
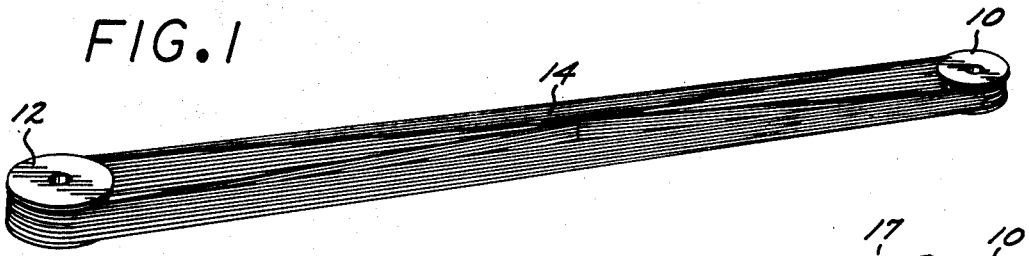
FIGS. 1-3 illustrate the fabrication of the solid-form, longitudinal spar member.

Referring now to FIG. 1, the construction of the solid-form, longitudinal spar member will be described. In this construction, two spools or bobbins 10 and 12 are mounted on shafts or otherwise secured and filaments of fibrous reinforcement material are laid across the spools to form a plurality of substantially parallel strands of the reinforcement material. During this winding, some of the fibers can be applied in substantially parallel passes while other fibers can be crossed in a figure-eight fashion. This winding produces a skein 14 of the fibrous reinforcement material in which the filaments of the fibrous reinforcement material are substantially unidirectional. The skein is impregnated with a suitable bonding resin, such as a polyester or epoxide resin. This embedding with a resin can be performed by coating each filament as it is applied onto the spools 10 and 12 or the wound skein 14 can be impregnated with a suitable amount of the bonding resin after it has been formed.

Figure 3:
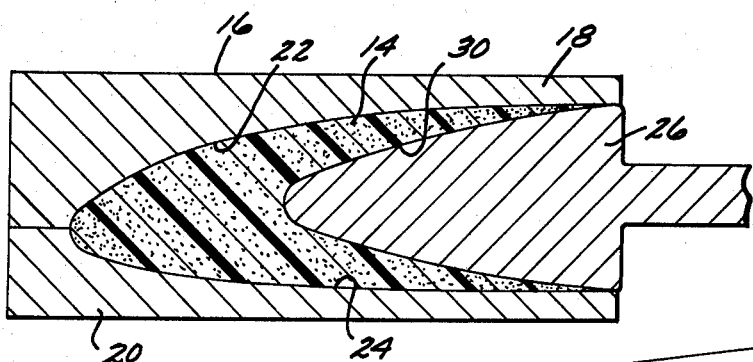

The flexible skein of yarn 14 is thereafter molded into a suitable longitudinal member for use as a leading edge in an airfoil section. This is accomplished by use of a mold 16 having upper and lower halves 18 and 20 which have die faces 22 and 24 that bear intaglio surfaces of the desired shape for the longitudinal member. Sufficient pressure is applied to flexible skein 14 to mold it into the finally desired shape and to this end a mold closure member is employed. This is illustrated in the cross sectional view of FIG. 3 wherein the skein 14 can be seen to be compressed by closure member 26 which is forced against the rear surface of the skein to compress it in tightly against the die faces 22 and 24 to shape the trailing edge of the longitudinal member into a suitable configuration. As illustrated in FIG. 3, the entering surface of closure member 26 is convex and imparts a concave trailing surface 30 to flexible skein 14. When the skein has been thus molded into the desired shape, the bonding resin is cured, either thermally or catalytically, to cement the skein into a rigid member.

Figure 2:
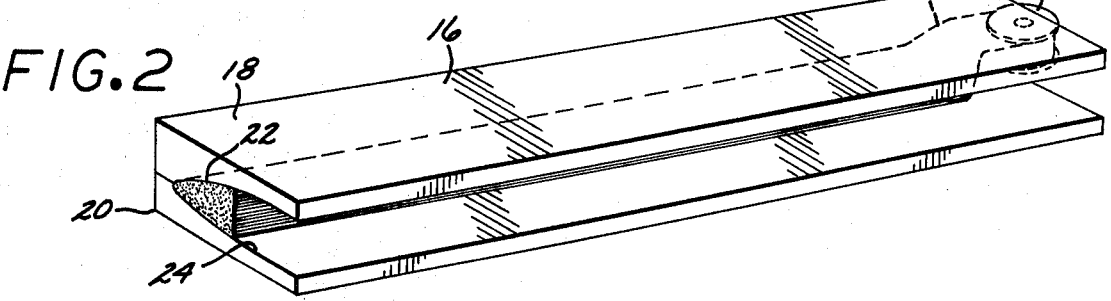

In a preferred embodiment, the spool means such as 10 is incorporated in the finally molded member to serve as a bearing support for this member and for the blade assembly which is to be formed thereon. To this end, the mold 16 has a suitable cavity 17 in which the spool 10 and the surrounding portion of skein 14 can be molded. As illustrated in FIG. 2, the mold cavity 17 is slightly off-set in a vertical direction at one of its extremities to permit the end of the skein to be molded in the off-set configuration. The opposite spool 12 can be removed from the skein by cutting the excess material. This excess material is preferably severed from the skein after the skein has been molded into a rigid load-bearing member; however, the skein can be trimmed to size at any time after placement in mold 16.

A flexible sheathing is next prepared on a flexible mandrel using the method described and claimed in copending application U.S. Ser. No. 442,391, filed Feb. 14, 1974. In this method, a flexible and inflated mandrel 31 is prepared by supporting end or dome plates 32 on suitable shaft means 34 and stretching therebetween a flexible sheet material to form a cylindrical mandrel. The sheet material is sealed in an airtight configuration about the end plates and along its longitudinal joint to form an airtight interior which is inflated to maintain the arcuate surface of the cylindrical mandrel during the winding operation. Alternatively, an elastic bag or sack can be placed within the mandrel and inflated to maintain the arcuate surface of the cylindrical mandrel during the winding operation. Alternatively, an elastic bag or sack can be placed within the mandrel and inflated with a positive differential pressure during the winding and molding steps. In either method, the interior of the mandrel should be provided with a flow conduit such as 33 which can be carried on an end plate and which is provided with a valve 35 whereby the differential pressure within the mandrel can be adjustably controlled. A continuous-filament winding process is then employed to apply a plurality of layers of continuous filaments of the fibrous reinforcement material. This is accomplished by attaching one end of one or more continuous filaments supplied as rovings to end plate 32 and rotating the mandrel while directing the filaments in a longitudinal, end-to-end, mandrel-traversing movement to apply them as a band of circular or helical windings on the mandrel. Sufficient positive differential pressure is applied to the interior of the mandrel by application of gas pressure to the sealed mandrel or to a sealed envelope within the mandrel to maintain its cylindrical shape during the winding process. The amount of differential pressure can be from about 0.5 to about 25 p.s.i.g. and can be gradually increased as the winding progresses; in a typical application the pressure could be increased from about 0.5 p.s.i.g. to about 10 p.s.i.g. at the completion of the winding.

The filaments are supplied from one or more rovings of filaments, i.e., ends, of filaments which are wound on spools that are mounted on a creel of the winding apparatus. The creel is carried on a carriage that moves from end-to-end as the mandrel is rotated. The filaments are passed from the creel through one or more baths of liquid and then applied to the mandrel at a predetermined tension, typically from about 0.1 to about 10, preferably from about 0.5 to about 5 pounds per roving. When the carriage of the winding apparatus reaches the end of the mandrel its direction is reversed to apply the remaining half layer of the filaments. The velocity of the carriage can be from about 0.5 to about 5 feet per second, typically about 3 feet per second and the mandrel can be rotated at a speed from about 10 to about 500, typically from 100 to about 200, revolutions per minute.

The process as thus described results in the application of filaments of fibrous reinforcement material onto the mandrel at helix angles, which are measured on the mandrel, between its axis and the band pass of the filaments, from about 5 to about 90 degrees. The filaments can be applied in various patterns including helical, hoop or polar wrapping patterns as used in the conventional, continuous-filament, winding process. Additionally, some bands of rovings can be applied at 0° to about 5° helix angles, i.e., longitudinally or substantially longitudinally on the mandrel by manual wrapping of the filaments about the mandrel.

A bonding resin is incorporated on the mandrel to embed the filament windings in a continuous film or coating of resin. The resin can be applied to the mandrel before starting the winding process or can be applied onto the wound mandrel after all the windings have been applied thereto. In the preferred application, the resin is coated onto the filaments of the fibrous reinforcement material while they are being applied to the mandrel. In this embodiment, the filaments would be passed through a bath of the resin immediately before being applied to the mandrel.

After a plurality of layers, generally from 1 to about 50, and preferably from 3 to about 10, have been applied to the mandrel, the winding process is discontinued and the ends of the filaments 38 are secured to one of the end plates. The internal differential pressure in the mandrel is then released to collapse the mandrel and form a flexible sheathing that can be used in forming the cellular article of manufacture.

Figure 5:
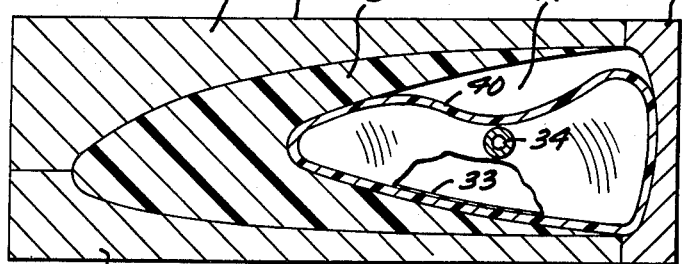
Figure 6:
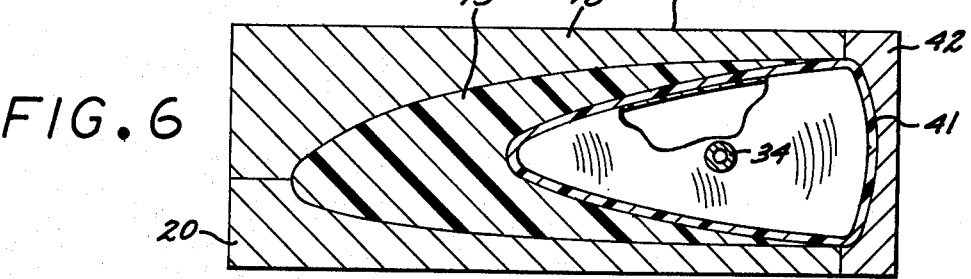

FIG. 5 illustrates the next step of the process. In this step, the flexible sheathing 40 which was formed on the mandrel in the manner previously described is placed in the concave groove 30 along the trailing edge of the solid-form, longitudinal spar member 15 formed by curing of the resin of flexible skein 14. FIG. 5 is a cross sectional view through mold 16 which is now fitted with a closure plate 42 to define a mold cavity 44 for molding of the flexible sheathing 40. In this view, the flexible sheathing 33 can be seen as forming an airtight envelope within flexible sheathing 40. A positive differential gas pressure is now established within flexible sheathing 40, e.g., by pressuring the interior of the mandrel and permitting the flexible sheet material 33 to expand sheathing 40 outwardly into contour-conforming contact with the interior die faces of mold cavity 44. This is illustrated in FIG. 6 where flexible sheathing 40 has been expanded into complete contact with the die faces of mold cavity 44. The bonding resin of sheathing 40 is then cured, catalytically or thermally, to cement the sheathing into a solid and rigid, load-bearing, tubular member 41. This also bonds the longitudinal leading edge member 15 securely to tubular member 41.

Figure 4:
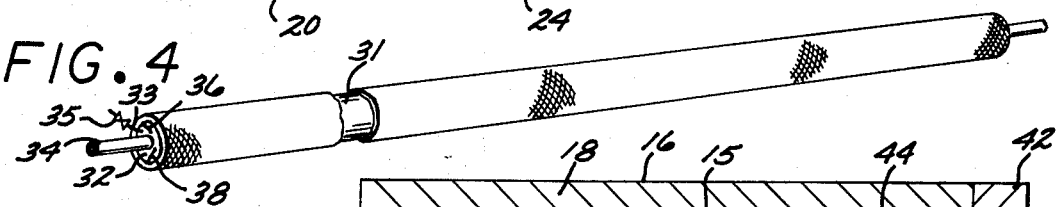
FIGS. 4-6 illustrate the preparation of the first chamber of the multi-chambered article of manufacture.
Figure 7:
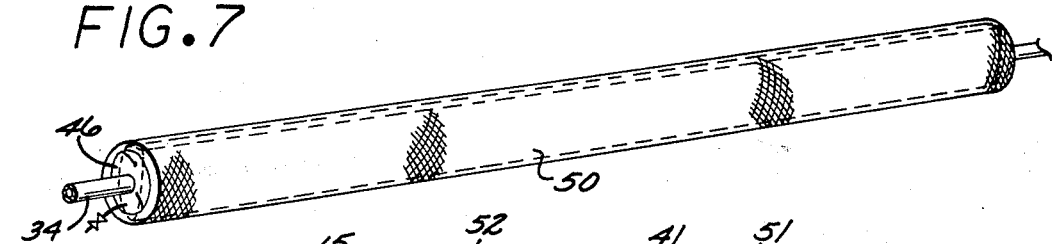
FIGS. 7 and 8 illustrate the fabrication of the second chamber of the multi-chambered article of manufacture.

The resultant assembly of longitudinal leading edge member 15 and hollow member 41 is then positioned within an outer flexible and inflated mandrel in the manner illustrated in FIG. 7. In this illustration end or dome plates 46 are positioned on shaft 34 and a flexible sheet material is laid between the end plates to define an outer cylindrical mandrel which is sealed to provide an airtight interior that is inflated in the manner previously described with regard to FIG. 4. The continuous-filament winding process is repeated to prepare an outer sheathing 50 about the resultant cylindrical mandrel. The pressure in the mandrel is thereafter released to collapse the sheathing 50 into a flexible sheathing which is then placed in a mold 52 formed of split halves 54 and 56 with an end closure member 58. The leading-edge, longitudinal spar member 15 is positioned at the most forward position in this mold cavity in the manner illustrated in FIG. 8, which is a cross sectional view of the mold cavity containing the article being manufactured. A positive differential fluid pressure is established within the interior of flexible sheathing 50, causing the flexible sheet material 43 to expand the sheathing outwardly into contour-conforming contact with the die faces of the mold cavity. The bonding resin is then cured by thermal or catalytic means to cement the sheathing 50 into a rigid, load-bearing structure 51 having the shape imparted thereto by the mold 52.

Figure 9:
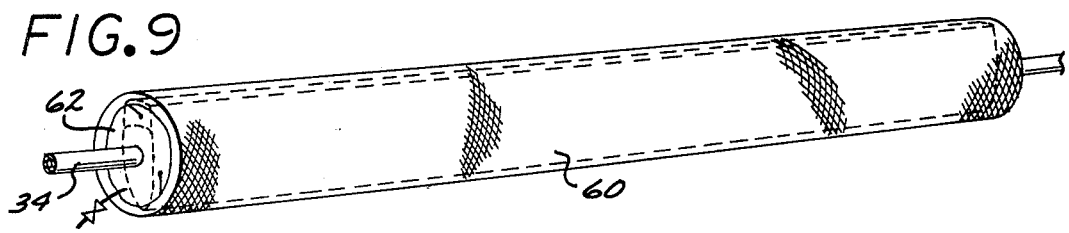
FIGS. 9-11 illustrate the fabrication of the third chamber of the multi-chambered article of manufacture.

The aforedescribed process can be repeated in the manner illustrated in FIG. 9 wherein the assembly of solid-form, longitudinal spar member 15 and rigid chamber members 41 and 51 are surrounded by another flexible and inflated mandrel which is assembled on shaft 34 using end plates 62 which are mounted on either end of shaft 34 and which support a continuous sheet of flexible material therebetween to form an airtight cylindrical mandrel that is inflated to the pressure previously described. A sheathing 60 is applied on the mandrel by the continuous-filament winding process.

Figure 10:
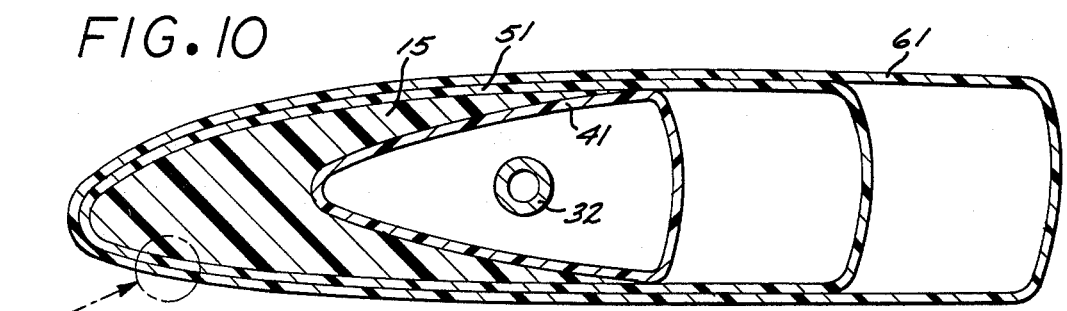
Figure 11:
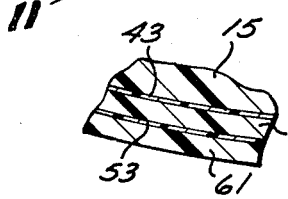

The sheathing 60 is collapsed from the inflated mandrel and is formed into another, rigid, load-bearing member 61 which is illustrated in FIG. 10 as comprising successive rigid members 61 and 51 which are formed about the inner assembly of solid-form, longitudinal, spar member 15 and its associated hollow member 41. As illustrated in FIG. 11, the laminations of these successive rigid members 61 and 51 which are formed about the inner assembly of solid-form, longitudinal, spar member 15 and its associated hollow member 41. As illustrated in FIG. 11, the laminations of these successive structural members 61 and 51 about spar member 15 are separated by intermediate layers 43 and 53 of the flexible sheet material used in preparing the mandrel used in the continuous-filament winding process and used to expand the sheathings outwardly against the die faces of the mold cavities.

Figure 12:
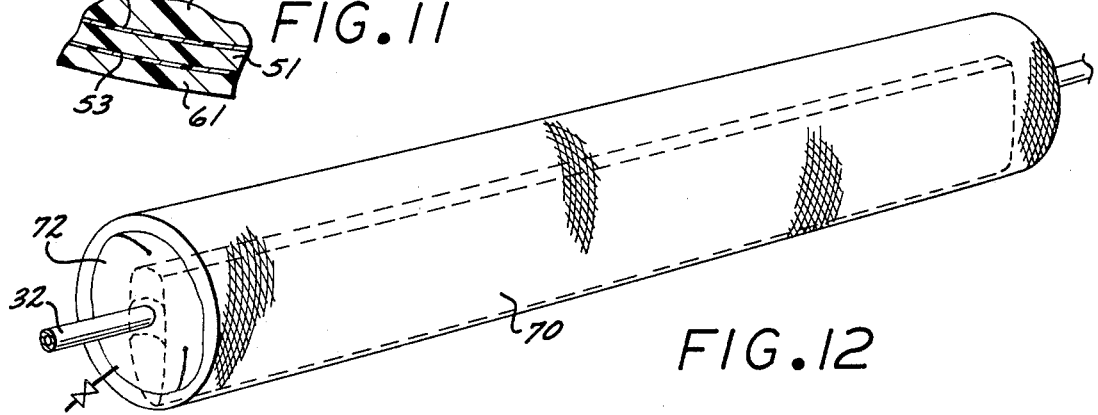

The continuous-filament winding process is again repeated in the manner illustrated in FIG. 12 wherein the assembly of longitudinal spar member 15, hollow member 41 and successive outer sheathings 51 and 61 are encompassed by a cylindrical mandrel formed thereabout by end plates 72 and another, outer sheath of flexible sheet material which is stretched between the end plates to form a cylindrical mandrel that is inflated with a positive differential pressure and used in a continuous-filament winding process. This process prepares an outer sheathing 70 formed of a plurality of layers of circumferentially or helically wound yarns of the fibrous reinforcement material.

Upon completion of the winding process, the positive differential pressure within the cylindrical mandrel is released to collapse the sheathing as a flexible sheathing 70 which can be molded into an airfoil configuration. This molding step is illustrated in FIG. 13 wherein the sheathing has been placed within a mold 74 formed of an upper, split half 76 and a lower, split half 78 which bear die faces bearing the intaglio form of the desired aerodynamic contour for the finally shaped article of manufacture. The rigid assembly of longitudinal spar member 15, hollow member 41 and successive, outer members 31 and 61 is placed in the mold cavity of mold 74 in the forwardmost position, care being taken to insure that the outer flexible sheathing 70 is laid smoothly between the mold faces and the outer surfaces of the outermost rigid member 61. The split halves 76 and 78 of the mold are assembled while permitting some excess sheathing 70 to be extruded from the trailing edge as a band or loop 73. The mold halves are secured together and a positive differential pressure is applied within the mold cavity to expand the sheathing 70 outwardly into a contour-conforming contact with the die faces of molds 74. Any material of the flexible sheathing which is necessary to permit expansion in this manner is supplied from the excess material of loop 73 during the expansion process. When the sheathing has been expanded into conforming contact with the die faces of the mold, the sheathing is cemented into a rigid, load-bearing structure by curing a bonding resin thermally or catalytically.

It is desirable to provide additional longitudinal spar members within cavity 80 of the resulting airfoil section to impart greater rigidity and strength thereto. This can be readily accomplished by forming additional flexible sheathings using a continuous-filament winding process in the manner illustrated in FIG. 14 in which end plates 84 are placed on shaft 82 and a plurality of layers of continuously wound filaments are formed thereon to form a sheathing 86 which can be collapsed and placed within the cavity 80 of the airfoil section.

It is also desirable to include a rigid solid-form member 93 formed of a plurality of unidirectional filaments of fibrous reinforcement material in the trailing edge portion of the airfoil section. This is accomplished by looping a plurality of strands of the filament of the fibrous reinforcement material about opposite spool members 88 and 90 to form a flexible skein 92 of the fibrous reinforcement material. As in the fabrication of flexible skein 14, previously described, the filaments can be looped in parallel passes about spools 88 and 90 and/or can be crossed from one side to the other as they are looped about the spools. FIG. 15 illustrates that a combination of these techniques is used in preparing skein 92.

The flexible skein 92 is placed within cavity 80 at the trailing portion of the airfoil section defined by outer member 71. A plurality of flexible sheathings 86, 87, 89 and 91 are placed within the cavity 80 and positive differential pressures are established within each of their interiors to expand these sheathings outwardly. A positive differential pressure is also established within cavity 80 which is sufficient to securely extrude the flexible skein 92 into the cavity along the trailing edge of the airfoil section. The differential pressure within chamber 80 should, of course, be less than the pressures established within the flexible sheathings 86, 94, 96 and 98 so as to permit the latter to expand outwardly into contact with the interior surfaces of the rigid sheathing member 71. After the sheathings have been expanded into contact with the interior surfaces of the rigid sheathing member 71, the bonding resins in the sheathings are cured, thermally or catalytically, to cement the sheathings into rigid, load-bearing members which thereby define a plurality of longitudinal spars or webs extending the length of the airfoil section.

The cross section of the finally completed airfoil section appears in FIG. 17 and can be seen to comprise a rigid, load-bearing, solid-form, leading edge member 15 and a similar, trailing edge member 93. Both of these members comprise rigid bundles of substantially unidirectional filaments of fibrous reinforcement material. The outer surface of the airfoil section is defined by rigid shell 71 and a plurality of successive laminations of similar shells 61 and 51 which extend over and about the leading edge member 15. As illustrated in FIG. 18, the successive laminations are separated by a plurality of layers of flexible sheet material 43, 53 and 63. The leading edge spar member 15 also contains a hollow tubular member 41 which is secured to its trailing surface and which, likewise, is surrounded by the successive shells 51, 61 and 71 of the structure. The airfoil section contains a plurality of longitudinal spar members 87, 95, 97 and 99 which are rigid load-bearing members that extend the length of the airfoil section and which are formed by the curing of the bonding resins of flexible sheaths 86, 94, 96 and 98, previously described.

Figure 8:
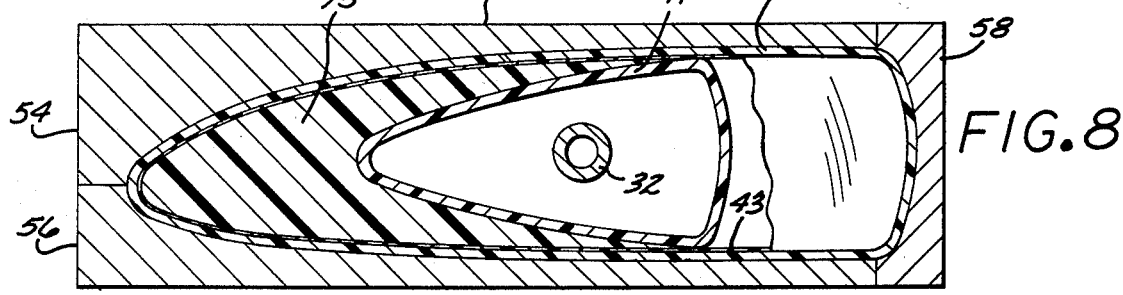

The aforedescribed method of preparing successive laminations of rigid shells 71, 61 and 15 about the longitudinal leading edge member 15 and its hollow spar member 41 can be modified to provide for the simultaneous curing of a plurality of flexible sheathings such as 70, 60 and 50 if such manufacture is desired. In this modification, the curing stages which are illustrated in FIGS. 8 and 10 as being intermediate steps between the sheath forming processes of FIGS. 7, 9 and 12, can be eliminated, thereby forming an assembly of three flexible sheathings 70, 60 and 50, about the rigid leading edge member 15 and its hollow spar member 41. These sheathings can be draped over the leading edge spar member 15 and the assembly placed in a mold cavity 74 as illustrated in FIG. 13. Thereupon, positive differential pressures can be applied within each of the successive flexible sheathings 50, 60 and 70 with the greatest differential pressure being established in the innermost sheathing 50, an intermediate pressure in the next sheathing 60 and the lowest differential positive pressure within chamber 80 of flexible sheathing 70. This would expand the sheathings outwardly into the shapes illustrated in FIG. 13. When so expanded, all the sheathings could be cured simultaneously into a rigid structure by catalytically or thermally curing the bonding resins of these sheathings.

SUITABLE FIBROUS MATERIALS

Any available fiber can be used as a reinforcement for resins used in the process. Examples of available fibers include organic fibers of rayon, cotton, silk, polyesters, etc. An example of a suitable organic fiber is Kevlar 49 which has a density of about 0.5 grams per cubic centimeter, a tensile strength of 400,000 p.s.i. and a Young's Modulus of 19 million p.s.i. Most desirably, however, fibers are employed which have relatively high tensile strength such as glass or carbon fibers. Type S glass fibers can be used and are preferred for their greater strength over Type E fibers. Typically the Type S fibers have tensile strength from 3 to $7 \times 10^5$ p.s.i. and Young's Modulus of about 12 to $13 \times 10^6$ p.s.i. The Type S fibers are obtained from a glass melt of silica, alumina and magnesia.

In their manufacture, the glass filaments are usually sized immediately upon formation to avoid any mechanical damage. A textile sizing, which consists of a dextrinised starch and emulsified vegetable oil, is sometimes applied. More commonly, a plastics sizing is applied which comprises a polyvinyl acetate base, a plasticizer and a resin coupling agent. When the textile sizing is present, it is necessary to remove the sizing from the filament before its application since the textile sizing is generally not compatible with the bonding resins. When the plastics sizing is employed, the filament can be directly applied and embedded with the bonding resin since it is compatible with the commonly used bonding resins.

When necessary, the filament can be de-sized by carmelization which comprises a heat treatment to volatilize the sizing and carbonize the starch, thereby reducing the residual sizing content to about 0.6%. The sizing can also be removed by passing the filament through a scouring bath to remove the organic material and reduce the residual sizing to below 0.3%. A combination of both treatments can also be used where the filament is passed through the aqueous bath and then passed through an oven at a temperature of about 300° – 350° C.

The filaments of glass fibers have diameters which range from about 0.0045 to about 0.015 millimeters in diameter. As described herein, the term filament has been used generically to refer to a single filament or to yarns or rovings of a plurality of filaments. These filaments can be used as yarns which are formed from a plurality of filament strands by twisting and plying the strands or as rovings which are bands of untwisted strands. The yarn is commonly designated by count which is the weight of the yarn per unit length and typical yarn counts are from 2.75 to 135 grams per kilometer of yarn length. The number of filaments which are combined into a strand of yarn range from about 50 to about 250 filaments. The yarns or rovings are supplied in a spool or bobbin with from 1 to about 300 ends which are wound into a cheese or cone shape. The rovings unwind during their application as a band of parallel, multiple filaments which are applied to the mandrel as a band.

Carbon base fibers can also be employed and are preferred because of their high tensile strengths. The carbon base fibers are prepared from filaments of carbonaceous materials which are heated to high temperatures under carefully controlled conditions to convert the carbonaceous material into substantially pure carbon. Rayon is one of the most commonly used carbonaceous material for preparation of the carbon and graphite fibers. The fibers are commonly referred to as partially carbonized, carbonized or graphatized, depending upon the severity of the heat treatment. The partially carbonized fibers are obtained by treatment of fibers at temperatures from 1300° to 1700° F. and have a carbon content up to about 90 weight percent. Fibers having carbon contents above 90 weight percent are obtained by carbonization at slightly higher temperatures and are generally referred to as carbonized fibers, while fibers which have been heated to graphatizing temperatures, i.e., temperatures from 4900° to 5400° F. are referred to as graphatized fibers. The commercially available carbon or graphite fibers have tensile strengths of about 1 to about $5 \times 10^5$ p.s.i. and Young's Modulus of 6 - $100 \times 10^6$ p.s.i. The fibers have densities of about 1.4 grams per cubic centimeter, although fibers having a high content of graphitic structure will have densities up to about 2 grams per cubic centimeter. The carbon base fibers are available as rovings similar to those described for the glass fibers, however, typically as a single filament wound on a spool.

RESIN SYSTEMS

The resins that are commonly used in the manufacture of fiber-reinforced plastics are generally resins which can be cured into a hardened condition with low molding pressures, typically less than about 200 p.s.i. and preferably cured at atmospheric pressure. The two most commonly employed systems are based on unsaturated polyester resins or epoxide resins. The polyester resins are copolymers of styrene and unsaturated polyesters and are supplied as a solution of linear unsaturated polyesters in styrene. The base polyesters are prepared by condensing phthalic and/or maleic anhydrides with propylene glycol and some diethylene glycol. The condensation is usually performed without a catalyst and at a temperature of about 200° C. for a period of time of about 10 hours to obtain a produce with an acid value of about 30 mg. KOH per gram. Water formed during the condensation is distilled from the produce and the unsaturated polyester so obtained is stabilized with a slight amount of phenol and dissolved in styrene to obtain the viscous liquid which is supplied to the fabricator as a polyester resin. In some resins, a part of the styrene monomer is replaced with methlmethacrylate to give weathering properties to the final product. The polyester resin is blended with a catalyst accelerator in most applications and suitable peroxide catalysts can be used, such as benzoyl peroxide, 1-hydroxycyclohexyl hydroperoxide-1, etc.

The second commonly used resin system for manufacture of fiber reinforced plastics is epoxide resins. These resins, which are preferred for their greater strength, are obtained by condensing diphenylolpropane with a molar excess of epichlorhydrin in the presence of sodium hydroxide as a catalyst and ethanol solvent. The excess epichlorhydrin and the alcohol solvent are distilled off and the sodium hydroxide is removed by washing. The epoxide resins are obtained as a low-molecular-weight, linear polycondensates. The epoxide resins require a hardening agent to react with the epoxy or hydroxl groups and form a cross-linked hardened resin. Typically, aliphatic polyamines and acid anhydrides are used as hardening agents. The amines most commonly employed are diethylene triamine, triethylene tetramine or tetraethylene pentamine which are employed in amounts comprising from 10% to 15% of the epoxy resin. A typically employed acid anhydride is phthalic anhydride which is used in an amount from 40 to about 50% of the epoxy resin.

The invention has been described by reference to a particularly illustrated and presently preferred mode of practice. It is not intended that by this description that the invention be unduly limited to the particularly illustrated mode of practice. Instead, it is intended that the invention be defined by the means, materials, and steps, and their obvious equivalents, set forth in the following claims.

I claim:

1. A fiber-reinforced plastic article of manufacture having a multi-chambered, cellular structure with an outer shell and an inner shell for use as part of a fluid foil structure, said inner shell extending between at least two generally opposite interior walls of said outer shell and being coupled thereto, thereby defining at least two chambers within said article, the wall of each of said shells being composed of a plastic having embedded therein at least one layer of continuous roving of a fibrous reinforcement material, said at least one layer in each of said shells being continuous and unbroken around each of said shells.

2. The article of claim 1 wherein substantial portions of the exterior wall of said outer shell are contoured in the shape of the adjacent portions of said fluid foil.

3. The article of claim 2 wherein said outer shell is the outermost shell of fibrous reinforcement material on said fluid foil.

4. The article of claim 2 further comprised of at least one additional layer of fibrous reinforcement material over said outer shell to define said fluid foil shape.

5. The article of claim 4 wherein said at least one additional layer of fibrous reinforcement material and said inner shell are separated at the forward region of said inner shell, at least in part, by an additional leading edge member.

6. The article of claim 2 wherein said substantial portions of the exterior wall of said outer shell which are contoured in the shape of adjacent portions of said fluid foil are immediately opposite a substantial portion of said at least two generally opposite interior walls of said outer shell which are coupled to said inner shell.

7. A fiber-reinforced plastic article of manufacture having a multi-chambered, cellular structure with an outer shell and an inner shell for use as part of a fluid foil structure, said inner shell being disposed within the interior wall of said outer shell and being coupled to a portion thereof, thereby defining at least two chambers within said article, the wall of each of said shells being composed of a plastic having embedded therein at least one layer of continuous roving of a fibrous reinforcement material, said fibrous reinforcement material being generally continuous and unbroken around each of said shells.

8. The article of claim 7 wherein substantial portions of the exterior wall of said outer shell are contoured in the shape of the adjacent portions of said fluid foil.

9. The article of claim 8 wherein said outer shell is the outermost shell of fibrous reinforcement material on said fluid foil.

10. The article of claim 7 further comprised of at least one additional layer of fibrous reinforcement material over said outer shell to define said fluid foil shape.

11. The article of claim 10 wherein said at least one additional layer of fibrous reinforcement material and said inner shell are separated at the forward region of said inner shell, at least in part, by an additional leading edge member.

12. The article of claim 8 wherein said substantial portions of the exterior wall of said outer shell which are contoured in the shape of adjacent portions of said fluid foil are immediately opposite a substantial portion of said at least two generally opposite interior walls of said outer shell which are coupled to said inner shell.

13. The article of claim 1 wherein at least one of said shells is also comprised of at least one layer of unidirectional fibers.

14. The article of claim 13 wherein said unidirectional fibers are 0° fibers.

15. The article of claim 13 wherein said unidirectional fibers are longitudinal fibers.

16. The article of claim 6 wherein at least one of said shells is also comprised of at least one layer of unidirectional fibers.

17. The article of claim 16 wherein said unidirectional fibers are 0° fibers.

18. The article of claim 16 wherein said unidirectional fibers are longitudinal fibers.

* * * * *